US 8,566,286 B1

(12) United States Patent
Hawton et al.

(10) Patent No.: US 8,566,286 B1
(45) Date of Patent: Oct. 22, 2013

(54) SYSTEM AND METHOD FOR HIGH SPEED DATABASE BACKUP USING RAPIDLY ADJUSTED DYNAMIC COMPRESSION RATIOS CONTROLLED BY A FEEDBACK LOOP

(75) Inventors: Brett Derek Hawton, Alamo, CA (US); Barry John Searle, Randburg (ZA); Daniel Aaron Hamilton, Pearland, TX (US)

(73) Assignee: Idera, Inc., Houston, TX (US)

( * ) Notice: Subject to any disclaimer, the term of this patent is extended or adjusted under 35 U.S.C. 154(b) by 709 days.

(21) Appl. No.: 12/700,799

(22) Filed: Feb. 5, 2010

Related U.S. Application Data

(60) Provisional application No. 61/178,749, filed on May 15, 2009, provisional application No. 61/246,464, filed on Sep. 28, 2009.

(51) Int. Cl.
*G06F 17/30* (2006.01)

(52) U.S. Cl.
USPC .......................................................... 707/654

(58) Field of Classification Search
None
See application file for complete search history.

(56) References Cited

U.S. PATENT DOCUMENTS

| | | | |
|---|---|---|---|
| 6,523,102 B1 | 2/2003 | Dye | |
| 6,711,632 B1 | 3/2004 | Chow | |
| 6,879,266 B1 * | 4/2005 | Dye et al. | ........................ 341/51 |
| 7,395,411 B2 | 7/2008 | Kasahara | |
| 7,409,570 B2 | 8/2008 | Suzuoki | |
| 7,437,492 B2 | 10/2008 | Stager | |
| 7,502,928 B2 | 3/2009 | Suzuoki | |
| 7,577,667 B2 | 8/2009 | Hinshaw | |
| 2008/0301164 A1 | 12/2008 | Isobe | |
| 2009/0100195 A1 | 4/2009 | Barsness | |

* cited by examiner

*Primary Examiner* — Belinda Xue
(74) *Attorney, Agent, or Firm* — Tim Shen

(57) ABSTRACT

A system and method for backing up a database, where the system has read threads running simultaneously, write threads, and data buffers. Each read thread repeats the following operations until all the data is backed up: read a block of data from the database, compress the data using a dynamic compression ratio which is initialized and adjusted after every compression, write the data to an available data buffer until the data buffer is full, write to the next available data buffer once the data buffer is full, and determine a new compression ratio. A controller determines the new compression ratio using either a method that monitors the timing of system components and/or a method that monitors CPU consumption.

21 Claims, 10 Drawing Sheets

SYSTEM AND METHOD FOR HIGH SPEED DATABASE BACKUP USING RAPIDLY ADJUSTED DYNAMIC COMPRESSION RATIOS CONTROLLED BY A FEEDBACK LOOP

CROSS-REFERENCE TO RELATED APPLICATIONS

The present application claims the benefit of and priority to U.S. Provisional Patent Application No. 61/178,749, filed on May 15, 2009, and U.S. Provisional Patent Application No. 61/246,464, filed Sep. 28, 2009—the contents of both applications are hereby incorporated and made part of this application.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present invention relates to database backup environments. More particularly, the present invention relates to systems and methods which backup databases by compressing data using dynamic compression ratios. More particularly, the present invention relates to compression ratios dynamically determined by a feedback loop.

2. Description of Related Art

Database data is routinely duplicated and stored in another storage medium, such as a file or another database, in order to protect the data saved in the original database. The process of duplicating data is commonly known as a backup. A backup typically compresses data of the original database in order to conserve space in the other storage medium where the data is stored. Because data is compressed before being transferred to the other storage medium for storage, a backup consumes time and resources of a backup system—reducing system performance.

Traditional backup software uses data gathered before a backup in order to perform the compression. For example, traditional backup software, such as "SQL Safe" marketed by BBS Technologies Inc., has certain compression ratios set by a user of the software prior to the onset of a backup. A compression ratio is the ratio between the uncompressed size of a block of data and the compressed size of said data. Compression ratios are set in order to compress the data during the backup such that the resulting backup file is significantly smaller than the data in the target object, or original database. Alternatively, traditional backup software can run on the computer system prior to the onset of a backup. The software evaluates the power and speed of any central processing unit (CPU) of the computer, the time taken to write a sample backup file, and/or the time taken to read the database, in order to determine a compression ratio. In both cases, the compression ratio is not changed during the backup, i.e., the backup software uses a static compression ratio during the backup.

FIG. 1 shows a block diagram of a prior art software backup program. The prior art program reads database pages/blocks and optionally compresses the data using a compression algorithm. The data, usually compressed, is then written to the IO subsystem of either the database server shown in FIG. 1 or another server. A problem associated with the prior art software backup program is that a static compression algorithm/ratio is used throughout the backup. Static compression algorithms/ratios can overload backup components, resulting in bottlenecks on various system components that inhibit backup performance. Even high loads on the components can create bottlenecks that decrease backup performance. These bottlenecks resulting from static compression ratios indicate that any fixed-user compression setting or sample run made before a backup begins can never guarantee that a backup occurs in the lowest elapsed time and at the highest compression ratio possible. Thus, there is a need in the prior art to minimize the use of static compression ratios during the backup.

Another problem associated with traditional backup software is that the load between components on a database server varies significantly each and every second. The central processing unit(s) of the database can work very hard for one second, and the next second the IO subsystem of the database can become overloaded. Variances in the composition of the data being backed up can also cause a variance on the load of the database server as it tries to compress blocks of data. The composition of some blocks of data allow for effortless compression to very high compression ratios whilst other data blocks in the same database contain somewhat incompressible data and can sharply raise the processing "load" on a computer. Thus, there is a need to manage the variances in loads of the components of a database server in order to optimize data compression and backup.

There are prior art backup systems that disclose backup environments that dynamically adjust (i.e. during a backup) a compression ratio(s) according to values of various system parameters, such as available tape space, backup window time, size of a data set, previous compression ratios, compression rates, transfer rates, transfer sizes, and CPU usage. Although such prior art systems can dynamically change compression ratios, there is a need to better control the changes in the value of the compression ratio itself so that a backup performs at the best speed and most efficient compression possible.

It is an object to backup data in the shortest period of time with the highest compression of data possible during that time.

It is another object to optimize both the speed and compression during backup of a database or transaction log to the IO subsystem of a computer.

It is another object to backup data in the fastest time and at the highest possible compression ratio despite variances in load occurring on the components of a computer or database server during said backup interval.

It is another object to backup a database in the fastest time and at the highest compression ratio possible despite variances in the composition of the data subject to backup.

It is another object to evaluate the speed at which data compression occurs on central processing unit(s) versus the speed at which compressed data is written to the IO subsystem and/or is read from the database.

It is still another object to monitor a percentage of a CPU consumed on a server during the backup.

It is another object to vary the compression level according to the percentage of a CPU consumed.

It is another object to compress data using a dynamic compression algorithm/ratio throughout the backup.

It is another object to monitor the backup environment and/or progress of a backup so as to determine a most effective compression algorithm/ratio at each discrete instant during the backup.

It is another object to obtain optimal balance between compression time and available system resources.

It is another object to damp and/or bias against tendencies of a backup system.

The objects of the disclosed system and method are not limited to those listed above. These and other objects are made apparent by the specification, claims, and drawings.

SUMMARY OF THE INVENTION

The disclosed system and method is for backing up a database. The system comprises two or more read threads running simultaneously, one or more write threads, and multiple data buffers. Each read thread repeats the following steps until all the data to be backed up have been read: reading a block of data from the database, compressing the data using a dynamic compression ratio which is initialized and adjusted after every compression by a controller, writing the data to an available data buffer until the data buffer is full, writing to the next available data buffer once the data buffer is full, and determining the new compression ratio. The two or more read threads can execute concurrently and write to the same available data buffer until it is full. Once the data buffer is full, one of the write threads writes the compressed data in the data buffer to a backup file.

Data compression is performed by monitoring system performance parameters and dynamically adjusting the compression ratio based on those parameters. A controller dynamically adjusts the compression ratio. The system performance parameters monitored are: the wait time of one of more read threads for available data buffer to write to, the wait time of one of more read threads to read database pages, the wait time of one of more write threads for a data buffer to be filled, and the CPU consumption on the server.

The compression ratio is dynamically adjusted using a PID, Fast Fourier, or Laplace Transform controller to increase or decrease the compression ratio according to the performance parameters monitored continuously during the backup. Particularly, the compression ratio is dynamically adjusted by a "Timing" method or a "Monitoring of CPU Consumption" method.

Other aspects and features of the disclosed system and method are made apparent by the following description, claims, and drawings.

DETAILED DESCRIPTION OF THE PREFERRED EMBODIMENT(S)

The System

Figure 1:
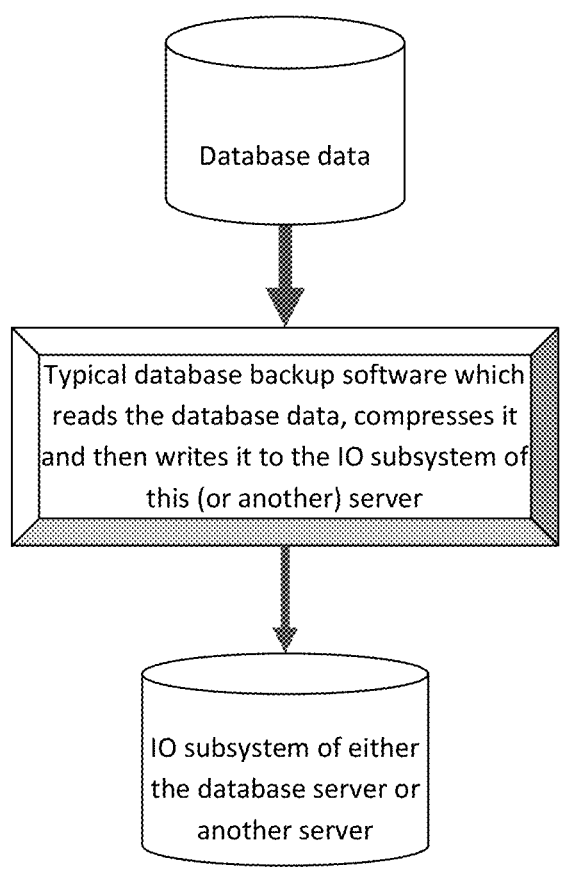
FIG. 1 shows a block diagram of a prior art software backup program.
Figure 2:
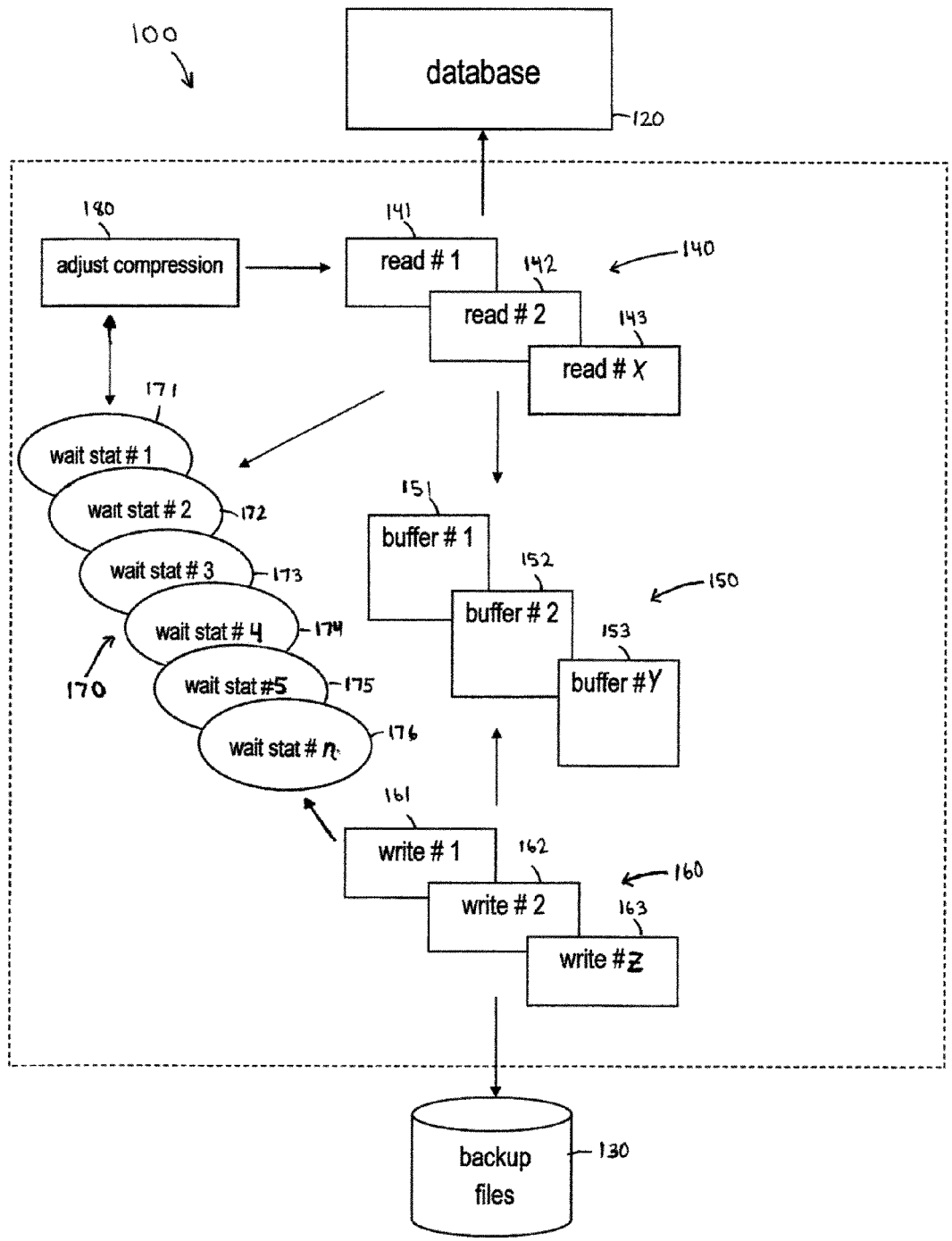
FIG. 2 shows a block diagram of the disclosed system.

FIG. 2 shows a block diagram of a preferred embodiment of the disclosed system 100. The system 100 is enclosed by the dashed lines in FIG. 2; thus, the system 100 can be connected to a database 120 and to a backup file 130. The database 120 can be any database in need of backup, such as a hard drive of a computer, a flash memory, etc. The backup file 130 can be any suitable medium for storing data. The system 100 has read threads 140, buffers 150, write threads 160, wait stats 170, and a controller program 180. The read threads 140 run concurrently and independently.

In FIG. 2, the read threads 140 have read threads 141, 142, and 143. Read thread 141 corresponds to "read #1", read thread 142 corresponds to "read #2", and read thread 143 corresponds to "read #x." Read thread 143, labeled as "read #x", shows that read threads 140 can have any number, "x", of threads necessary for a particular backup. The buffers 150 have buffers 151, 152, and 153. Buffer 151 corresponds to "buffer #1", buffer 152 corresponds to "buffer #2", and buffer 153 corresponds to "buffer #y". Buffer 153, labeled as "buffer #y", shows that buffers 150 can have any number, "y", of buffers necessary for a particular backup. The number, "y", of buffers 150 does not have to be the same as the number, "x", of read threads 140. The write threads 160 have three write threads 161, 162, and 163. Write thread 161 corresponds to "write #1", write thread 162 corresponds to "write #2", and write thread 163 corresponds to "write #z". Write thread 163, labeled as "write #y", shows that write threads 160 can have any number, "z", of write threads necessary for a particular backup. The number, "z", of write threads 160 does not have to be the same as the numbers, "x" and "y", of the read threads 140 and buffers 150. The wait stats 170 have wait stats 171, 172, 173, 174, 175, and 176. Wait stats 171-176 correspond to wait stat #1 through wait stat #n, respectively. The number, "n", of wait stats 170 depends on the number, "x" and "z", of read threads 140 and write threads 160. Wait stat 171 corresponds to the wait times of writing and/or reading of read thread 141. Wait stat 172 corresponds to the wait times of writing and/or reading of read thread 142. Wait stat 173 corresponds to the wait times of writing and/or reading of read thread 143. Wait stat 174 corresponds to the wait times of writing of write thread 161. Wait stat 175 corresponds to the wait times of writing of write thread 162. Wait stat 176 corresponds to the wait times of writing of write thread 163.

In the general operation of the system 100, the read threads 140 read a block of data from the database 120. If the read threads 140 cannot read data from the database 120, the read threads 140 track the wait time until data can be read from the database 120. The wait times of read threads 141, 142, and 143 are wait stats 171, 172, and 173, respectively. The read threads 140 then compress the data using a dynamic compression ratio which is initialized and adjusted by the controller program 180 after each compression. The read threads 140 then write the data, usually compressed, to a data buffer 151 of data buffers 150 until the data buffer 151 is full. When data buffer 151 is full of data, the read threads 140 continue writing data to the next available buffer, which is buffer 152. The read threads 140 continue reading data from the database and writing into buffer 152 until buffer 152 is full. When buffer 152 is full, the read threads 140 then write data to buffer 153 until buffer 153 is full. Thus, read threads 140 write data into the buffers 150, successively filling each buffer 151, 152, and 153 (up to "y" number of buffers). When the last buffer 153 is full, the read threads 140 again fill buffer 151 with data, assuming buffer 151 is empty and available to receive data. If buffer 151 is not empty and available, the read threads 140 track the wait time until buffer 151 is available. The wait times of read threads 141, 142, and 143 are wait stats 171, 172, and 173, respectively. The read threads 140 move from buffer to buffer, repeating the above actions until all the target data is read from the database 120 and written to the buffers 150. The wait stats 170 of the read threads 140 can be stored in a simple linear program array in a computer main memory, which provides for rapid accessibility of the wait stats 170.

The data buffers 150 store compressed data written by the read threads 140 until the write threads 160 read the data from the buffers 150. When buffer 151 is full of data, write threads 160 read data from the buffer 151 and write the data to the backup file 130. Write threads 160 read the data from the buffer 151 and write the data to the backup file 130 until buffer 151 is empty of data. Write threads 160 then read data from buffer 152; assuming buffer 152 is full and available. If buffer 152 is not full and available, write threads 160 track the wait time to read data from buffer 152. The wait times of write threads 161, 162, and 163 are wait stats 174, 175, and 176, respectively. When buffer 152 is empty of data, the write threads 160 read data from buffer 153 (up to "y" number of buffers); assuming buffer 153 is full of data and available. If buffer is not available, the write threads 160 track wait times as wait stats 170, as described above for buffer 152. The write threads 160 move from buffer to buffer, reading data from the buffers 150 and writing the data to the backup file 130, repeating the above actions until all the target data is written to the backup file 130. The wait stats 170 of the write threads 160 can be stored in a simple linear program array in main memory, which provides rapid accessibility for the wait stats 170. The wait stats 170 of the write threads 160 are kept separate from the wait stats 170 of the read threads 140 so that the wait stats 170 of the write threads 160 and the wait stats 170 of the read threads 140 can be directly compared and used as described below.

The reading speed of the read threads 140 varies according to the size and type of data read from the database 120. The compression speed of the read threads 140 varies according to the compression ratio (i.e. level of compression) of the data. The writing speed of the read threads 140 varies according to the availability of empty buffers 150. The reading speed of the write threads 160 varies according to the availability of full buffers 150. The writing speed of the write threads 160 varies according to the size and type of data written to the backup file 130. Because the above-mentioned speeds vary, the read threads 140 and write threads 160 inevitably wait to write to, and read from, the buffers 150. Thus, the dynamic compression ratio is adjusted to account for the changes in above-mentioned speeds so as to optimize the overall speed and efficiency of the backup.

A controller program 180 retrieves the wait stats 170 (e.g. from the linear program array in the computer main memory) to determine the optimal dynamic compression ratio for the next backup iteration. The controller program 180 uses a number of timing mechanisms to accurately gauge the instantaneous speed of compression versus the instantaneous speed of file-writing and database-reading at each evaluation. Short-term variances are minimized using a PID algorithm (standard, Fast Fourier, or Laplace Transform) such that the net differences in speed among reading, writing, and compression actions are accurately measured and the correct compression algorithm is selected to best match any changed circumstances. The controller program 180 evaluates the wait stats 170 several times per second throughout the backup process and adjusts the dynamic compression ratio according to the conditions discussed below.

The controller program 180 monitors system parameters concerning the speed of compression, reading, and writing of the read threads 140 and the write threads 160. These speeds are tracked as wait times in the wait stats 170. A compression ratio is initially set at the onset of a backup and repeatedly adjusted according to any differences in speed of reading, writing, or compression actions for a "best fit" scenario so as to guarantee both the best speed and highest compression during a backup. The controller program 180 can also monitor the parameter of overall CPU consumption and vary the compression algorithm/ratio for a "best fit" scenario.

Specifically, the controller program 180 monitors the time which for the read threads 140 wait for one or more buffers 150 to become available into which compressed data may be inserted, the time it takes read threads 140 to compress the data, the time it takes read threads 140 to read data from the database 120, and the time which the write threads 160 wait to read data from the buffers 150 and write the data to the backup files 130 (the "Timing" method). The controller program 180 can also monitor the CPU consumption (in the "Monitoring of CPU Consumption" method). The system 100 can use the "Timing" and "Monitoring of CPU Consumption" methods singly, alternately, or in combination for a backup.

The "Timing" Method

Figure 3A:
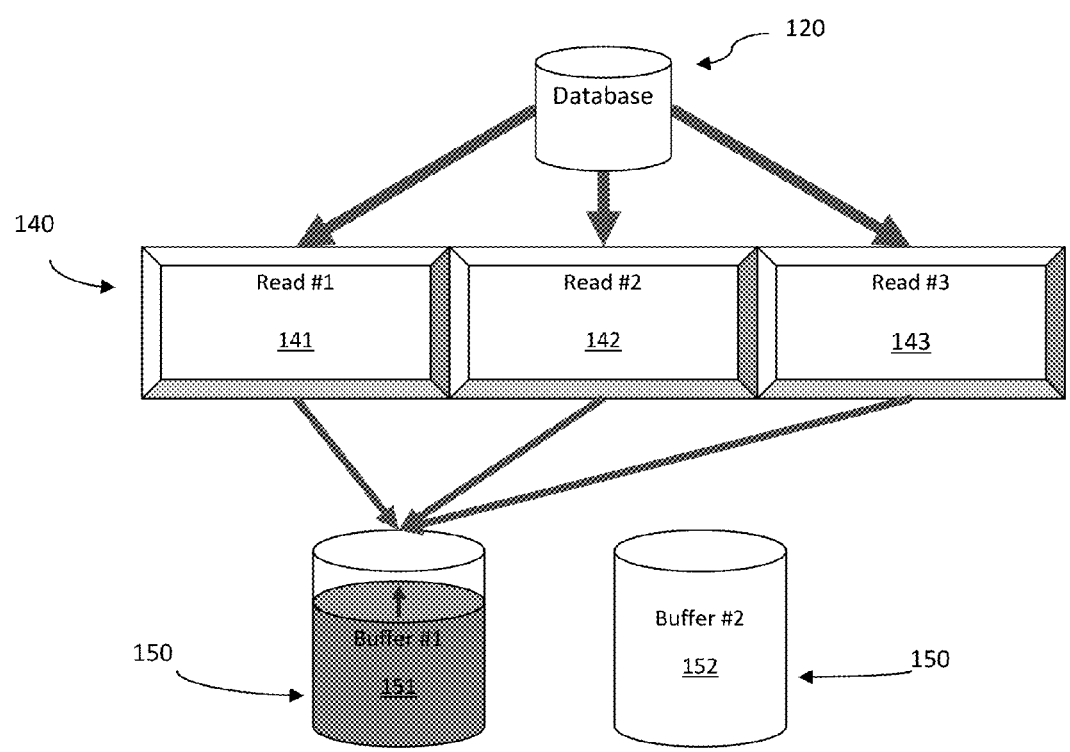
FIGS. 3A to 3G show a series of block diagrams illustrating one embodiment of the disclosed method.

FIGS. 3A to 3G show a series of block diagrams illustrating one preferred embodiment of the disclosed method using parts of the system 100 disclosed in FIG. 2, the method being referred to herein as the "Timing" method. In FIG. 3A, at onset of the backup method, the backup software creates read threads 140. Three read threads 141, 142, and 143, from read threads 140 of system 100 are shown for illustrative purposes, but more or less can be used as needed for a particular backup. The read threads 140 read data from the database 120 and compress the data using a default compression routine. The default compression routine moderately compresses the data without too much or too little compression. The read threads 140 can have threads designated only for compression, only for reading, only for writing, or designated for a combination thereof. Once the read threads 140 compress a block of data, the read threads 140 write the compressed block of data to buffer 151, which can reside in a computer memory. Buffer 152 remains empty at the onset of backup until buffer 151 is filled with data.

The flow of data is shown by arrows in FIG. 3A. The arrows pointing from the read threads 140 to the buffer 151 have a smaller width than the arrows pointing from the database 120 to the read threads 140. The smaller width indicates the reduced size of the block of data due to compression. All of read threads 140 write into the same buffer 151 until buffer 151 is filled with compressed data.

Figure 3B:
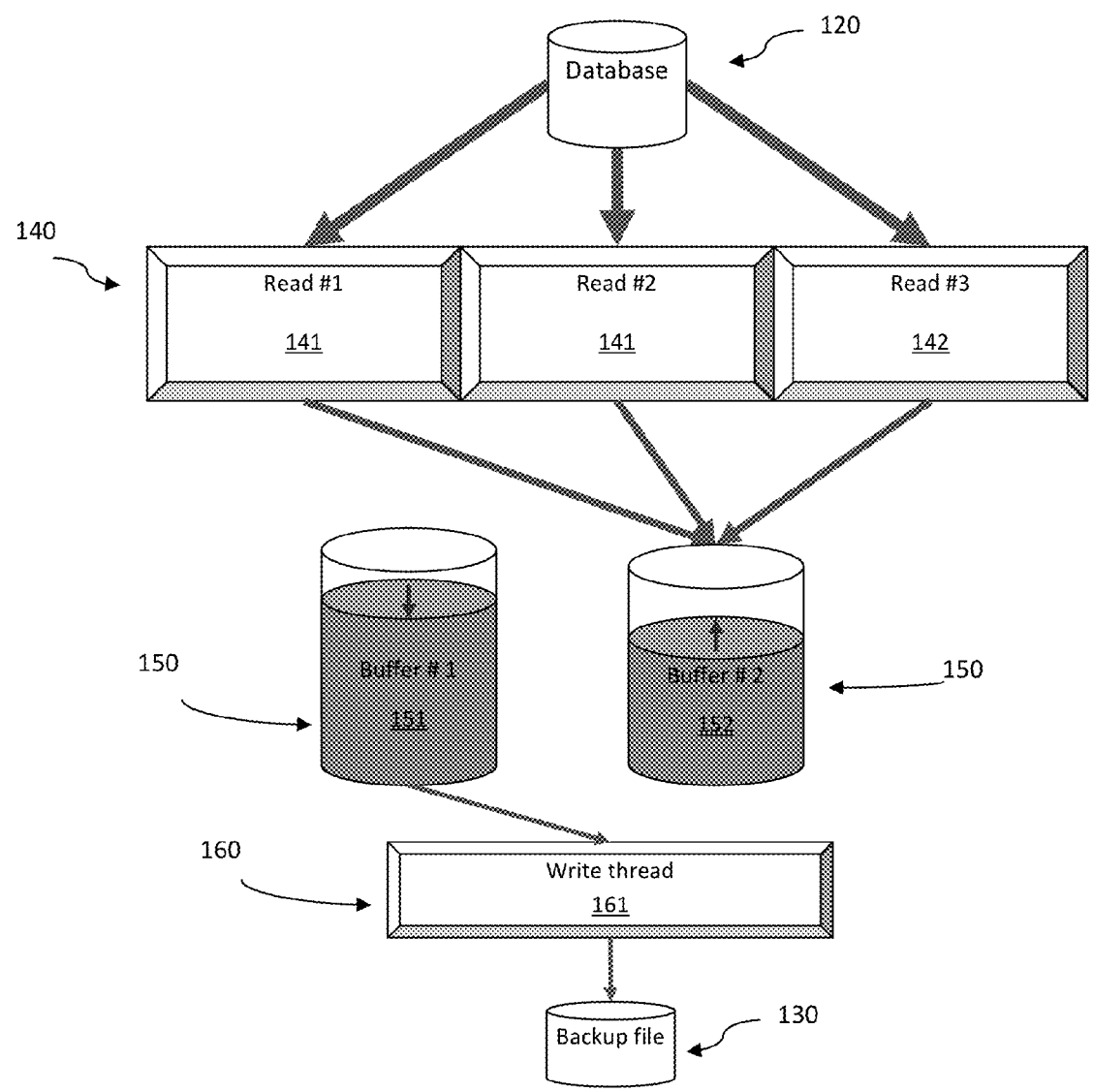

In FIG. 3B, buffer 151 has been filled with compressed data. When buffer 151 is full of compressed data, a signal is sent to write thread 161 indicating buffer 151 is full, directing write thread 161 to read the compressed data from buffer 151, and directing write thread 161 to write the compressed data to the backup file on the IO subsystem. Thus, compressed data of buffer 151 flows to the backup files 130 as the write thread 161 reads and writes the compressed data from the buffer 151 to the backup files 130.

While the write thread 161 empties compressed data from the buffer 151, read threads 140 are directed to write any remaining compressed blocks of data to buffer 152. Thus, buffer 151 is emptied of compressed data while buffer 152 is filled with compressed data. Two buffers 151 and 152 are shown in FIG. 3B, but any number of write buffers necessary for a backup environment can be used.

Figure 3C:
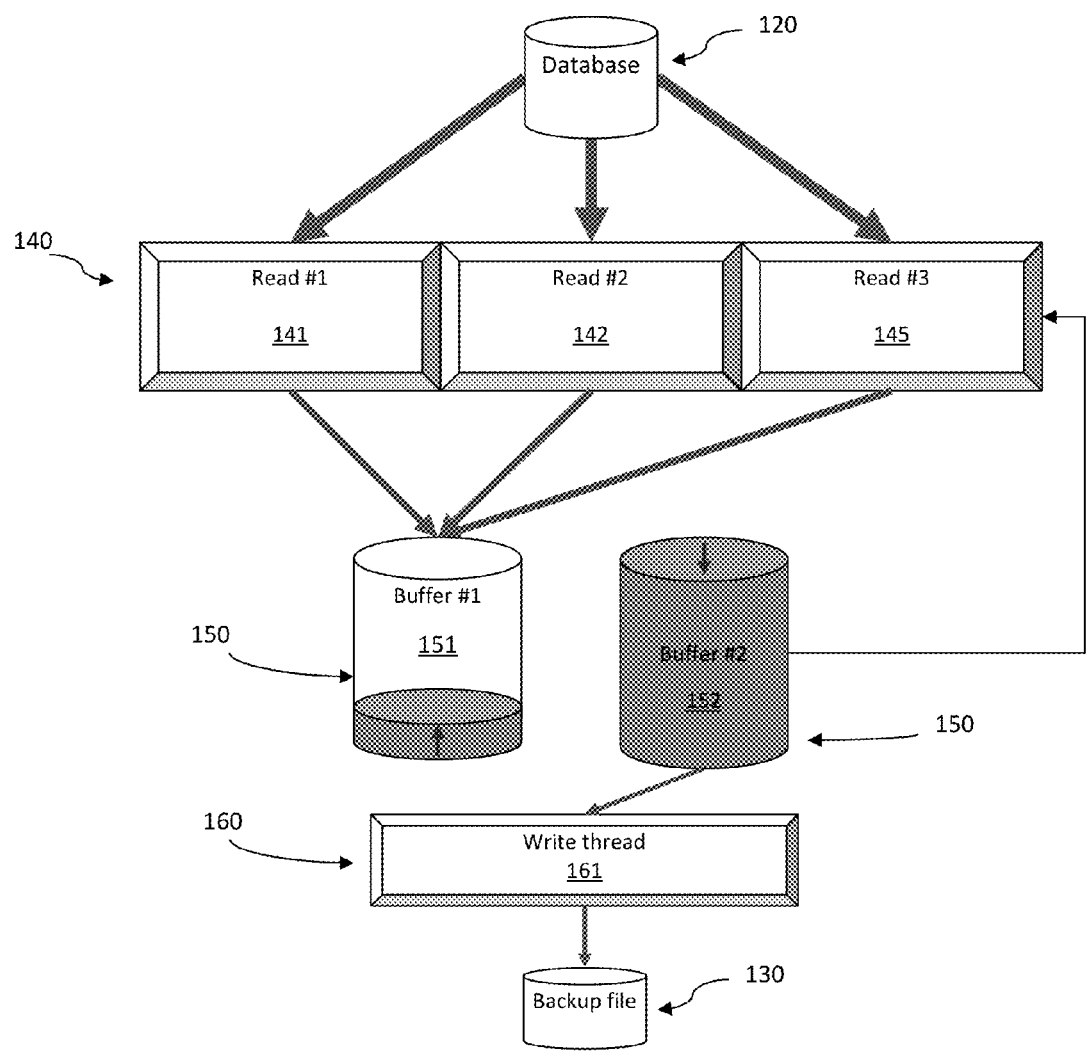

In FIG. 3C, buffer 152 is full of compressed data written by read threads 140. When the buffer 152 is full, a signal is sent to the read threads 140 to measure any amount of time between when the read threads 140 complete compressing a block of data and when the read threads 140 begin or complete writing the block of compressed data to buffer 151. When buffer 152 is full, another signal is sent to the write thread 161 to measure any amount of time between when the write thread 161 writes all compressed data from buffer 152 to the IO subsystem backup file 130 and when the write thread 161 begins reading compressed data from buffer 151 for writing to the backup file. In FIG. 3C, when either of buffers 151 or 152 is full, the read threads 140 write to the other of the buffers 151 or 152. Likewise, when either of buffers 151 or 152 is full of data, the write thread 161 reads and writes the data to the backup file 130.

Figure 3D:
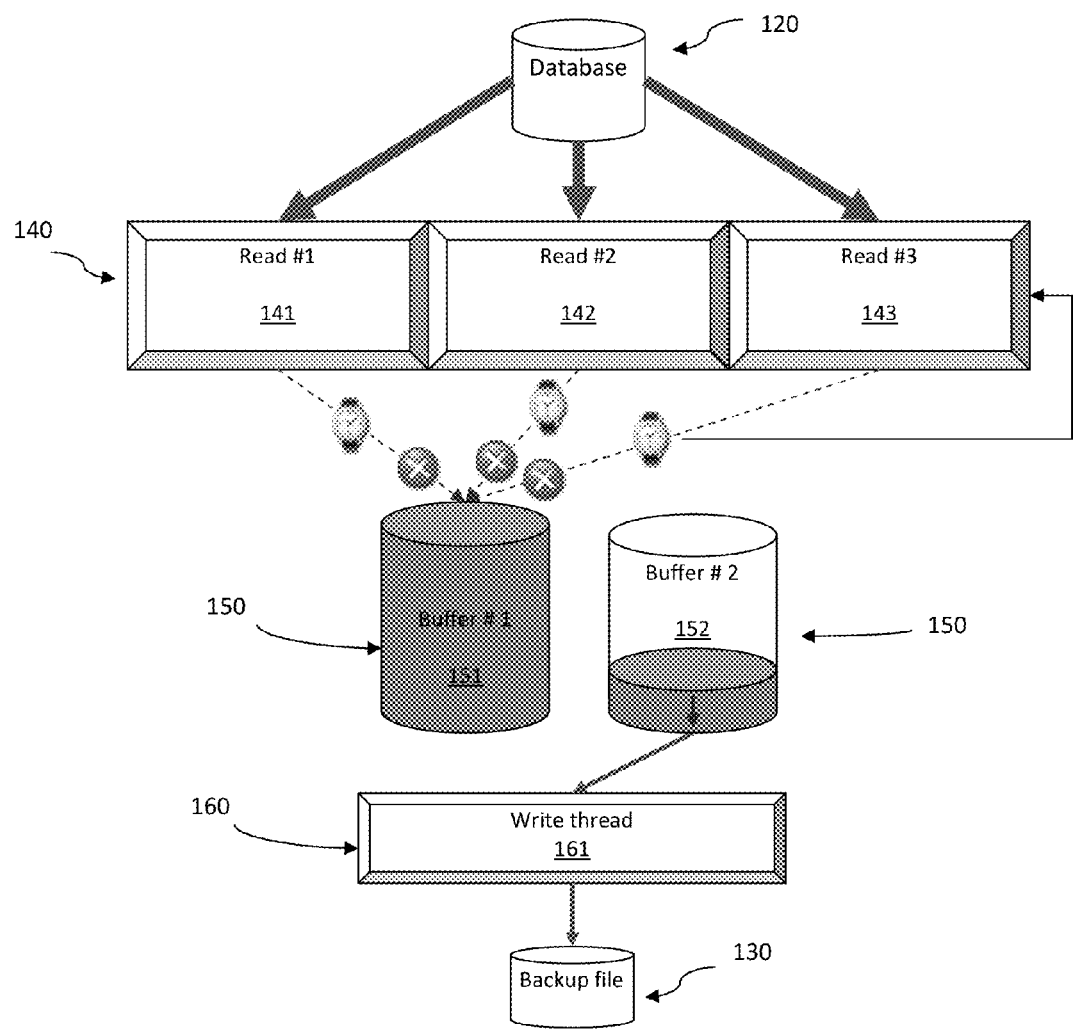
Figure 3E:
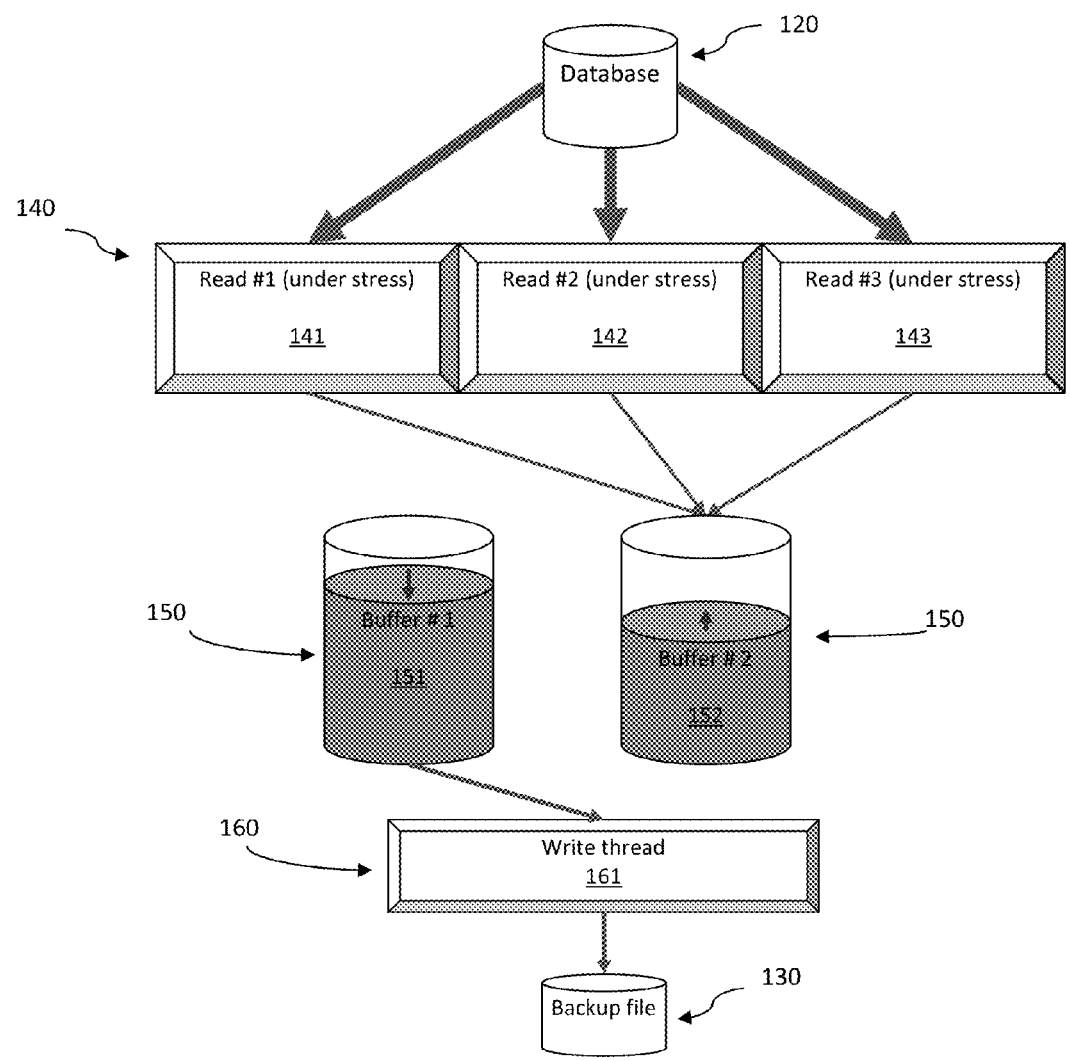

FIGS. 3D and 3E show the operation of the "Timing" method when the operation of read threads 140 is faster than the operation of write thread 161. That is, a bottleneck occurs in the write thread 161 which causes the read threads 140 to wait. FIG. 3D shows buffer 152 read by the write thread 161 and buffer 151 full of compressed data. The buffer 151 waits for the write thread 161 to read compressed data stored in buffer 151 and write the compressed data to the backup file 130. The read threads 140 cannot write additional compressed data to the buffer 151 because buffer 151 is full; additionally, read threads 140 cannot write any compressed data to buffer 152 because write thread 161 are reading buffer 152. The arrows between read threads 140 and buffer 151 are shown with dashed lines to indicate the absence of data flow therebetween.

The scenario shown in FIG. 3D occurs frequently because the read threads 140, collectively, can easily read and compress data from the database 120 and then write the data into the buffers 151 and 152 faster than the write thread 161 is able to read the compressed data from the buffers 151 and 152 and write the compressed data to the backup file 130 of the IO subsystem. Neither of buffers 151 or 152 is available for read threads 140 to write compressed data; thus, read threads 140 must wait an amount of time for write thread 161 to empty buffer 152 so that read threads 140 can write data to buffer 152. The first thread of read threads 140 to wait (141, 142, or 143) starts the amount of time read threads 140 must wait for buffer 152 to become available. The amount of time ends when read threads 140 can write to the buffer 152. The start and end times, or wait stats (170 in FIG. 2), are retrieved by a controller program (180 in FIG. 2). In the scenario shown in FIG. 3D, the controller program 180 measures the amount of time between the start and end times that the read threads 140 wait for buffer 152 to become available, and instructs all the read threads 140 to begin using a higher dynamic compression ratio. The higher compression ratio causes compression threads of read threads 140 to take longer to compress the data from the database 120 so as to better match the time the write thread 161 take to empty buffer 152.

FIG. 3E shows a dynamic compression ratio of the read threads 140 that is adjusted higher in response to the scenario of FIG. 3D. Selecting a higher compression ratio will place the read threads 140 under stress and has the effect of easing the required amount of data to be written to the backup file because the compression threads of read threads 140 compress each block of data more than before. The higher the compression of a block of data, the less data needs to be written. The net effect is that more of the database backup is placed on the backup files 130, and data flow between the read threads 140 and buffer 152 decreases.

Having instructed the read threads 140 to compress the data with a higher compression ratio, the controller program 180 again measures the length of time the read threads 140 wait to write to an available buffer 151 or 152, if any. The controller program 180 continues monitoring wait stats 170 of the read threads 140. If subsequent wait stats 170 decrease, i.e. trend toward a zero wait time, the controller program 180 can instruct the same or smaller compression ratio for the read threads 140. If subsequent wait stats 170 increase, i.e. trend greater than the new baseline wait stat, the controller program 180 can instruct the same or higher compression ratio for read threads 140. The controller program 180 continuously monitors the wait stats 170 of the read threads 140 and adjusts the dynamic compression ratio of read threads 140 during backup.

Figure 3F:
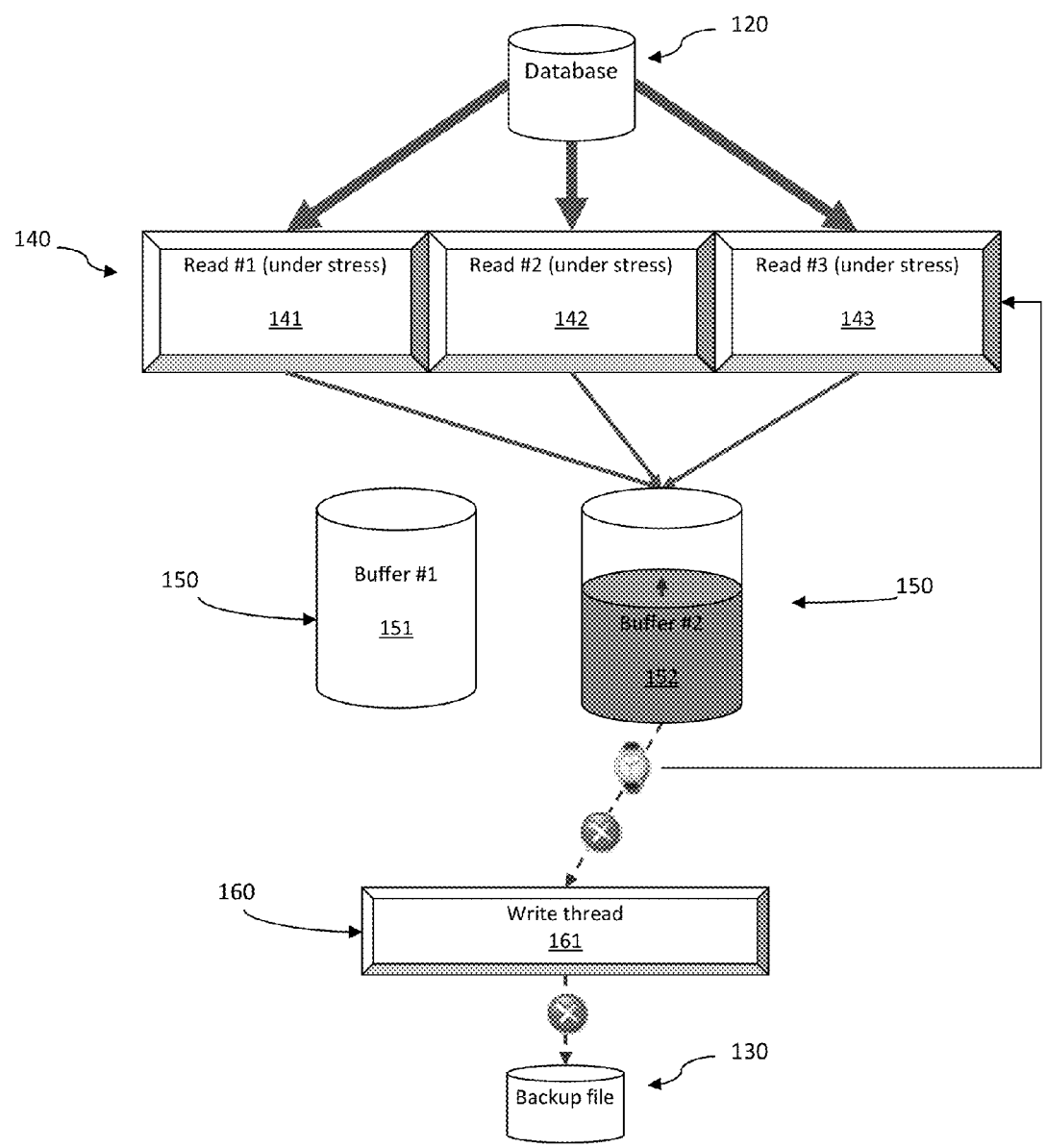

FIG. 3F shows operation of the "Timing" method when the read threads 140 operate slower than the write thread 161. That is, a bottleneck occurs in the read threads 140 (i.e., under stress), which is indicated by the dashed arrows between the buffer 152 and the write thread 161. The write thread 161 cannot read compressed data from buffer 152 because the read threads 140 are writing compressed data to buffer 152. Moreover, the buffer 151 is empty, so write thread 161 cannot read any data from buffer 151. In this scenario, either the dynamic compression ratio is too high or the server CPUs are servicing other applications, thus reducing ability of the CPU to process the compression threads of read threads 140. Whatever the reason, the combined throughput of the read threads 140 does not match the speed at which the write thread 161 empties the buffer 152 onto the IO subsystem of the backup file 130.

In the scenario of FIG. 3F, the write thread 161 waits for a signal from the controller program 180 that buffer 152 is full. The wait stats for the length of time which the write thread 161 waits are communicated to the controller program 180. The controller program 180 then signals the read threads 140 to compress data with a lower compression ratio. Reducing the compression ratio has the net effect of increasing the volume of data written to the buffer 152. The controller program 180 waits 0.1 seconds (or other chose time interval) before accepting any further wait stats 170 from the write thread 161. A baseline wait stat is set using the most recent write-thread wait stat. The wait stats 170 of the write thread 161 are then monitored to see if the wait stat 170 of the write thread 161 increases or decreases. If subsequent wait stats 170 increase, the controller program 180 can instruct the same or lower compression ratio for the read threads 140. If subsequent wait stats 170 decrease, i.e. trend toward zero, the controller program 180 can take no action.

Figure 3G:
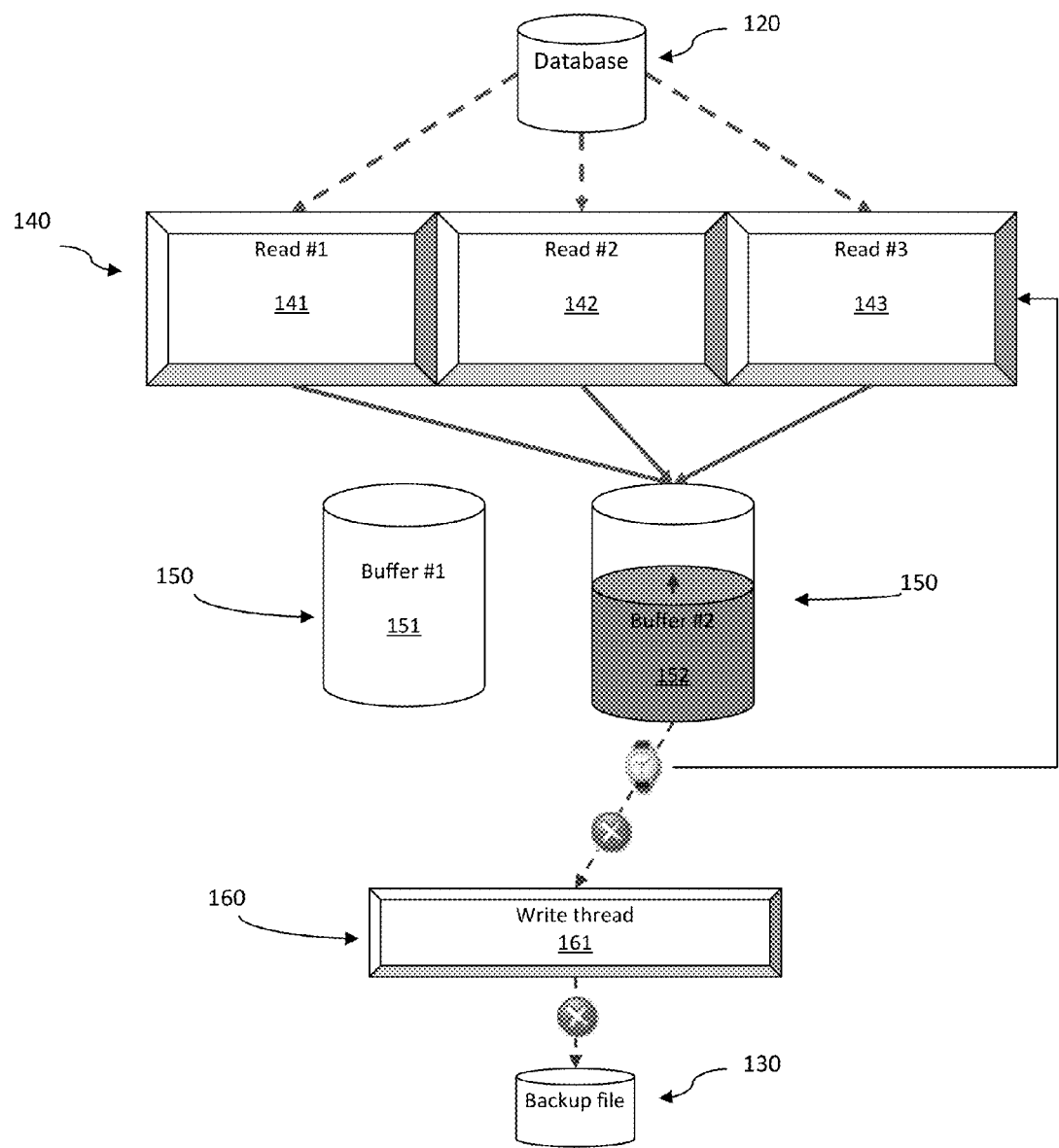

FIG. 3G shows operation of the "Timing" method with a bottleneck of data flow between the database 120 and the read threads 140. The scenario shown in FIG. 3G is referred to as a "read-constrained" environment. The dashed arrows between the database 120 and the read threads 140 indicate inhibited flow of data therebetween. In a "read-constrained" environment, the dynamic compression ratio is increased to reduce the size of the backup file 130. Because blocks of data flow slowly from the database 120, both the read threads 140 and write thread 161 wait for blocks of data from the database 120. When the dynamic compression ratio is increased, read threads 140 compress data that is received from the database 120 to a greater degree. The read threads 140 then write more data to the buffer 152, and the write thread 161 then reads the large amount of highly compressed data from the buffer 152 and writes the data to the backup file 130, resulting in a smaller backup file 130. The bottleneck between the database 120 and read threads 140 causes the write thread 161 to wait for data to read from the buffer 152. The write thread 161 has emptied buffer 151, and the dashed arrows between buffer 152 and the write thread 161 indicate data is not flowing therebetween because the write thread 161 is waiting for buffer 152 to fill with compressed data.

The Controller Program of the System and Method

Referring again to FIG. 2, the wait stats 170 are inputs to the controller program 180. The controller program 180 biases and damps the system 100 with a feedback loop so the system 100 performs as quickly and as efficiently as possible. Particularly, the controller program 180 monitors the wait stats 170 (as described above), calculates a net error from the wait stats 170, decides whether to increase or decrease (or leave unchanged) the dynamic compression ratio of the system 100, uses the net error in a PID algorithm to obtain a PID output that is biased and damped for the system 100, scales the PID output to a percentage in a dynamic range, chooses a dynamic compression ratio based on a lookup of compression ranges, and saves the PID variables for the next iteration. The controller program 180 biases and damps the system 100 for the slowest part of thereof, which experiments have shown is typically the write threads 160.

The calculate the net error, "N", the controller program 180 uses the following equation:

$$N = A + B - C \qquad (1),$$

where "A" is the "read-thread read wait time," "B" is the "write-thread read wait time," and "C" is the "read-thread write wait time." The read-thread read wait times (RTR wait times) are the wait stats 171, 172, 173 (shown in FIG. 2) that are the time the read threads 140 of system 100 wait to read data from the database 120. The read-thread write wait times (RTW wait times) are the wait stats 171, 172, and 173 that are the time the read threads 140 wait to write data to the buffers 150. Thus, each of wait stats 171, 172, and 124 has two wait stats, a first wait stat for the RTR wait time and a second wait stat for the RTW wait time. The RTR wait time and the RTW wait time can also be in separate wait stats 170. The write-thread read wait times (WTR wait times) are the wait stats 174, 175, 176 that are the time write threads 160 wait to read data from the buffers 150. The controller program 180 thus retrieves these wait times from the wait stats 170 of the system 100. The controller program 180 uses the net error "N" to determine whether to increase or decrease the dynamic compression ratio of the system 100. The preferred net error, "N", is zero. The net error can also be referred to as a set-point for the system 100.

The controller program 180 decides to increase or decrease the dynamic compression ratio of the read threads 140 of the system 100 according to two conditions: 1) the dynamic compression ratio is increased if the net error is greater than the set-point (e.g. preferably zero), and 2) the dynamic compression ratio is decreased if the net error is less than the set-point. The dynamic compression ratio is not changed if the net error equals the set-point.

Alternatively, the controller program 180 decides to increase or decrease the dynamic compression ratio of the read threads 140 of the system 100 according to the following conditions: 1) the dynamic compression ratio is increased if the RTR wait time is above a RTR set-point or if the RTW wait time is above a RTW set-point or if the WTR wait time is below a WTR set-point, and 2) the dynamic compression ratio is decreased if the RTR wait time is below the RTR set-point or if the RTW wait time is below the RTW set-point or if the WTR wait time is above the WTR set-point.

To bias and damp the wait times of the system 100, the controller program 180 has standard PID logic using a PID feedback loop. Fast Fourier or Laplace Transform logic can also be used. The PID logic creates a PID output that is the sum of three correcting terms: 1) the Proportional term, 2) the Integral term, and 3) the Derivative term. Generally, the Proportional term (gain) is proportional to the magnitude of error. The Integral term (gain) is proportional to both the magnitude of the error (difference from the set-point) as well as the duration of the error (the length of time which the current error has existed for). The number of elements in the array can be kept in main computer memory). The Integral term provides the "insistence" on eliminating an error should the proportional term prove too small or fail to eliminate the error despite successive attempts to do so. The Derivative term (gain) measures the rate of change of the error over time, i.e. the slope. The Derivative term slows the rate of change when the slope of the history of the error would seem to intersect the set-point value (the desired zero-error value) in the immediate future. The derivative value hence provides resistance to an overshoot of the desired set-point. This PID logic allows the compression ratio of the system 100 to be changed in a feedback loop so as to reduce the net error "N", and wait times of the read threads 140 and write threads 160, during a backup.

To determine the actual amount by which the dynamic compression ratio should be increased or decreased, the net error "N" is input to the PID logic. The Proportional term of the controller program 180 is the difference between the net error "N" of the system 100 and an ideal set-point (preferably zero error). The Proportional term thus indicates the adjustment needed to eliminate the net error "N". The Integral term is the summation (addition) of the last x net error "N" amounts as measured, which are kept in a program array in a memory. The last ten error amounts to be summed can be kept in the program array in the main memory, but any number of error amounts to be summed can be used. The Derivative term is the rate of change, or difference, between two successive PID outputs.

The PID logic of the controller program 180 creates a PID output for the system 100. The controller program 180 scales the PID output by means of a fixed mathematical ratio, e.g. 1:1.6, to a percentage in a range between zero and one hundred. The controller program 180 then uses the percentage (0% to 100%) as an input to a translation lookup table which is initially read from an initialization file (which can be adjusted) at the start of the backup and then kept in program memory for rapid access thereafter. In the translation lookup table, each range of percentages resolves to a specific compression ratio. For example, 0% to 10% can correspond to a compression ratio 1, 11% to 20% can correspond to a compression ratio of 2, 21% to 30% can correspond to a compression ratio of 3, and so on. Thus, the percentage is converted to a compression ratio to be used as the dynamic compression ratio. The controller program 180 then saves the PID variables (Proportional, Integral and Derivative values as described above) in program memory arrays for the next iteration of the controller program 180.

Figure 4:
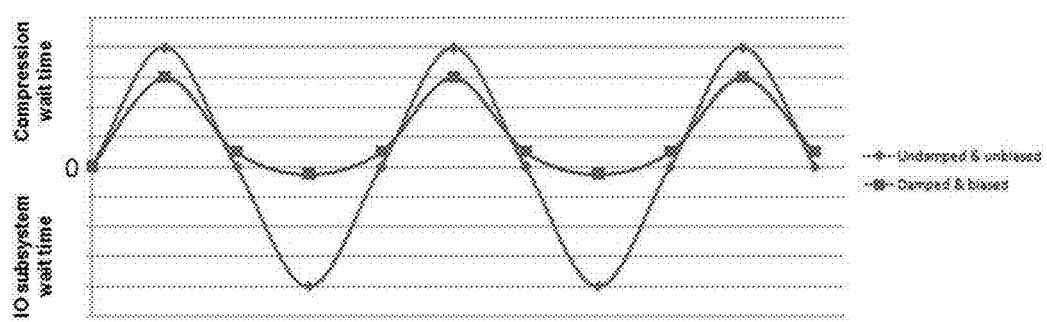
FIG. 4 shows a graph of compression and IO subsystem wait time versus the time of a backup.

FIG. 4 shows a graph of compression wait time and IO subsystem wait time versus the time of the backup. Two curves are shown: a curve of an unbiased, un-damped curve system, and a curve of the biased and damped system 100 using controller program 180. The curve that depicts an unbiased, un-damped backup system is the curve that oscillates equally between compression wait time and IO subsystem wait time. The curve that depicts the biased and damped backup system 100 is the curve that has reduced compression wait time and significantly reduced IO subsystem wait time.

Compression wait time in FIG. 4 is the RTR wait time and RTW wait time, discussed above. IO subsystem wait time is WTR wait time, discussed above. The biased and damped curve of system 100 in FIG. 4 typically oscillates between the scenario where read threads 140 wait for the write thread 161 and the scenario where the write thread 161 waits for the read threads 140. As can be seen in FIG. 4, the curve that is biased and damped in system 100 has a reduced compression wait time and IO subsystem wait time compared to the unbiased and un-damped curve. The IO subsystem wait time of the damped and biased curve is significantly reduced compared to the un-damped and unbiased curve. The graph in FIG. 4 shows that a PID feedback loop that accounts for the wait times of the read threads 140 and write threads 160 according to the above disclosure greatly reduces the compression wait time and IO subsystem wait time in a backup environment.

The "Monitoring of CPU Consumption" Method

The disclosed method has another embodiment, known as the "Monitoring of CPU Consumption" method. The "Monitoring of CPU Consumption" method operates similarly to the "Timing" method; however, instead of using wait stats to monitor the wait intervals between reading, compressing and writing, the "Monitoring of CPU Consumption" method continuously monitors the overall CPU consumption of the server (typically by querying the "Processor\% processor time\_Total" performance counter in Microsoft Windows) during the backup. When a server is either read-constrained (as described above) or write-constrained (waiting for compressed data blocks to be written to the IO subsystem), the consumption of CPU by the backup is typically lower. Depending on the load of other applications (including SQL Server), the total CPU consumption is likely to be at least a little lower, too.

If CPU consumption is low, then the dynamic compression ratio can be increased. That is, should the total CPU consumption on the server as a whole be less than 100% (or a selectable set-point), then spare CPU capacity can be used to compress the blocks of data from the database 120 and to log blocks of data without affecting the speed of the backup system or the usability or responsiveness of other applications. When CPU consumption is low, the dynamic compression ratio is gradually increased until one of two conditions is satisfied: 1) the CPU consumption reaches 100% (or the selected set-point), or 2) the highest dynamic compression ratio available to the application is reached. In the second condition, if the user selects a specific user-compression level which contains a sub-selection of all of the available compression ratios, then the dynamic compression ratio is increased until the highest compression ratio allowed in that user-selected compression level is reached. The controller signals the read threads 140 to increase the dynamic compression ratio when the above conditions of CPU consumption are satisfied. The read threads 140 compress more data so that more CPU is consumed by the backup system 100, the system 100 performs at the highest compression possible, and the backup runs as quickly as possible.

Conversely, if the CPU consumption is too high or 100%, then the compression can be decreased. That is, if CPU consumption is running at or near 100% (or above the selected set-point), then a lower compression ratio is selected. When CPU consumption is too high, the dynamic compression ratio is gradually decreased until one of two conditions is satisfied: 1) the CPU consumption drops below 100% (or the selected set-point), or 2) the lowest compression ratio available to the application is reached. In the second condition, if the user selects a specific user compression level which contains a sub-selection of all of the available compression ratios, then the dynamic compression ratio is decreased until the lowest compression ratio allowed in that user-selected compression level is reached. As in the "Timing" method, the controller signals the read threads 140 to decrease the dynamic compression ratio when the above conditions of CPU consumption are satisfied. The read threads 140 compress less data so that less CPU is consumed by the backup system 100 so as to eliminate a bottleneck in the CPU during a backup.

The "Monitoring of CPU Consumption" method utilizes as much of the CPU resources as possible to compress the data as much as possible without causing CPU thrashing—a situation where excessive CPU time is required and the progress of the backup is slowed or stalled. Thus, the "Monitoring of CPU Consumption" method ensures a backup system compresses data as much as possible while simultaneously operating as rapidly as is possible.

Either of the "Timing" or the "Monitoring of CPU Consumption' methods can be selected for disclosed backup system. The methods can also be used in combination for a backup using system 100. The compression of data is dynamically altered in a feedback loop monitoring and evaluating the wait stats of the read threads 140 and 206 and CPU consumption during a backup so as to compress as much data as possible is the smallest amount of time possible.

The foregoing description is illustrative and explanatory of the disclosed embodiments. Various changes can be made to the embodiments without departing from the spirit and scope of the invention. Therefore, the invention should be limited only by the following claims and their legal equivalents.

We claim:

1. A computer-implemented process comprising:
    executing, by a computer processor, at least two read threads to read a block of data from a database, each of the read threads having a first wait stat and a second wait stat, the read threads configured to compress data using a dynamic compression ratio;
    providing, by the computer processor, at least one buffer, the read threads to compress the block of data and then write the block of data to the buffer;
    executing, by the computer processor, at least one write thread to read the block of data from the buffer, the write thread to write the block of data to a backup file, the write thread having a wait stat; and
    executing, by the computer processor, a controller program to monitor the wait stat of the write thread and to monitor the wait stats of the read threads, the controller program to calculate a net error, the controller program to change a value of the dynamic compression ratio of the read threads based on a set-point, the controller program to determine the value of the dynamic compression ratio of the read threads using the net error as an input to a Proportional-Integral-Derivative feedback loop.

2. The process of claim 1, the read threads to execute concurrently and independently.

3. The process of claim 1, the first wait stat of each the read threads being a read thread read wait time, the second wait stat of each of the read threads being a read thread write wait time, the wait stat of the write thread being a write thread read wait time.

4. The process of claim 3, the read thread read wait time being a length of time which the read thread waits for the block of data from the database, the read thread write wait time being a length of time which the read thread waits to write the block of data to the buffer, the write thread read wait time being a length of time the write thread waits for to read data from the buffer.

5. The process of claim 3, the controller program to increase the dynamic compression ratio when the read thread read wait time is above the set-point, the controller program to decrease the dynamic compression ratio when the read thread read wait time is below the set-point.

6. The process of claim 3, the controller program to increase the dynamic compression ratio when the read thread write wait time is above the set-point, the controller program to decrease the dynamic compression ratio when the read thread write wait time is below the set-point.

7. The process of claim 3, the controller program to decrease the dynamic compression ratio when the write thread read wait time is above the set-point, the controller program to increase the dynamic compression ratio when the write thread read wait time is below the set-point.

8. The process of claim 1, the controller program to increase the dynamic compression ratio when the net error is above the set-point, the controller program to decrease the dynamic compression ratio when the net error is below the set-point.

9. The process of claim 8, the set-point being zero.

10. The process of claim 1, the controller program to increase the dynamic compression ratio when the CPU consumption is below the set-point, the controller program to decrease the dynamic compression ratio when the CPU consumption is above the set-point.

11. The process of claim 1, the Proportional-Integral-Derivative feedback loop having a Proportional-Integral-Derivative output, the controller program to determine the value of the dynamic compression ratio based on the Proportional-Integral-Derivative output.

12. A computer system for performing backup of an electronic database comprising:
two or more read threads, each read thread operating independently from and concurrently with other read threads, and each read thread having read wait stats associated with the each read thread;
at least one write thread, the write thread having write wait stats;
two or more data buffers, each data buffer having a status of available or full;
a controller program that runs continuously during backup;
wherein, each read thread is configured to:
a. read a block of data to be backed up from the database,
b. compress the block of data using a dynamic compression ratio, the dynamic compression ratio being updated continuously by the controller program, whereby the controller program uses a Proportional-Integral-Derivative feedback loop to dampen the updated dynamic compression ratio,
c. write the compressed block of data to an available data buffer until the data buffer is full,
d. update read wait stats, and
e. repeat steps a-d until all blocks of the data to be backed up in the database has been read from the database;
wherein, the write thread is configured to:
m. wait for a full data buffer,
n. read the compressed data from the full data buffer,
o. write the compressed data to a backup file,
p. update write wait stats, and
q. repeat steps m-p until all of the data to be backed up in the database has been written to the backup file; and wherein, the controller program is configured to:
x. retrieve the most current read wait stats from each read thread,
y. retrieve the most current write wait stats from the write thread,
z. determine a new compression ratio based on the most current read wait stats and the most current write wait stats and update the dynamic compression ratio for each read thread, and
repeat steps x-z until the backup of the database has been completed.

13. The system of claim 12, wherein the read wait stats comprise:
a first read wait stat being a length of time that the read thread waits to read a buffer of data from the database; and
a second read wait stat being a length of time that read thread waits to write a buffer of data to the data buffer.

14. The system of claim 12, wherein the write wait stats are lengths of time that the write thread waits to read data from the data buffers.

15. The system of claim 12, wherein the dynamic compression ratio is increased when the read wait stats are above a set-point, the set-point being a configurable parameter, and the dynamic compression ratio is decreased when the read wait stats are below the set-point.

16. The system of claim 12, wherein the dynamic compression ratio is decreased when the write wait stats are above a set-point, the set-point being a configurable parameter, and the dynamic compression ratio is increased when the write wait stats are below the set-point.

17. A computer-implemented method for backup of an electronic database, the method comprising steps of:
a. providing a plurality of data buffers, each data buffer having a status of available or full;
b. selecting a portion of the database or the entire database for backup;
c. reading a block of data from the selected portion of the database;
d. compressing the block of data using a dynamic compression ratio, wherein the dynamic compression ratio is set at an initial value and then is dynamically adjusted during the backup using a Proportional-Integral-Derivative feedback loop;
e. writing the compressed block of data to an available data buffer until the data buffer is full;
f. when the data buffer is full, writing the full data buffer to a backup file;
g. collecting read wait stats during read from the database and collecting write wait stats during write to the data buffer;
h. adjusting the compression ratio based on the wait stats; and
i. repeating steps c-g until all of the data in the selected portion of the database has been backed up.

18. The method of claim 17, wherein the read wait stats are lengths of time waiting to read the block of data from the database and lengths of time waiting to write the block of data to the data buffer.

19. The method of claim 17, wherein the write wait stats are lengths of time waiting to read blocks of data from the data buffers.

20. The method of claim 17, wherein the compression ratio is increased when the read wait stats are above a set-point, the set-point being a configurable parameter, and the dynamic compression ratio is decreased when the read wait stats are below the set-point.

21. The method of claim 17, wherein the compression ratio is decreased when the write wait stats are above a set-point, the set-point being a configurable parameter, and the dynamic compression ratio is increased when the write wait stats are below the set-point.

* * * * *